United States Patent Office 3,493,316
Patented Feb. 3, 1970

3,493,316
DYED FIBER PRODUCTS
Hans Ortheil and Donald J. Hilscher, Chester, Va., assignors to Allied Chemical Corporation, New York, N.Y., a corporation of New York
No Drawing. Filed May 9, 1966, Ser. No. 548,381
Int. Cl. C09b 9/02
U.S. Cl. 8—34  3 Claims

ABSTRACT OF THE DISCLOSURE

A dyed fiber comprising a polymer blend of polyester dispersed in a polyamide matrix, said fiber being dyed with a dye selected from the group consisting of anthraquinone vat and anthraquinone disperse dyes, said fiber containing up to fifty parts by weight polyester per 100 parts by weight of total polyamide and polyester.

---

This invention relates to novel dyed products. More particularly it relates to fibers prepared from blends of polyesters and polyamides and dyes with anthraquinone vat or anthraquinone disperse dyes.

It is known that polyamides, particularly nylons such as nylon 6 and nylon 66, can be effectively dyed employing a wide range of dyestuffs. It is also known that polyesters can be dyed satisfactorily only with a limited range of dyestuffs, and in general with dyeing procedures substantially more elaborate than that employed with nylon. Thus it would have been postulated that the quality of dyeing obtainable with fibers prepared from nylon-polyester melt blends would be intermediate in the quality achievable with polyamides alone and polyesters alone. More specifically, it would have been predicted that the quality of dyeing achievable with such blends would depend upon the relative proportions of each ingredient in the blend, and that the quality would be poorer than obtainable with pure nylon.

It has now been found that anthraquinone disperse and anthraquinone vat dyes, in direct contrast to what would have been predicted, exhibit a remarkable affinity for fibers prepared from polyester-polyamide blends. This is the fundamental discovery on which this invention is predicated.

It has further been discovered that a remarkable variety of dyeing effects can be achieved by control of certain parameters in the blends dyed and in the process of dyeing. Attainment of these effects is based on the findings that:

(1) Dyeing characteristics of polyester-polyamide blends can be modified with changes in temperature of the dye bath.

(2) Dyeing characteristics of polyester-polyamide blends are relatively insensitive to changes in pH in the dye bath.

(3) Dyeing characteristics of polyester-polyamide blends vary with varying polyester content.

The remarkable affinity of anthraquinone vat and anthraquinone disperse dyes for polyester-polyamide fiber blends is most unexpected when the poor affinity of those dyes for polyester is considered. It would certainly have been predicted that the incorporation of polyesters in polyamides would result in a product in which the affinity for those classes of dyes would decrease with increasing polyester content. In direct contrast to this expectation, it has been found that the affinity of polyester-polyamide blends for anthraquinone vat and anthraquinone disperse dyes is even better than the affinity for these same dyes exhibited by the parent polyamide from which the blend is prepared. This discovery makes possible the production of products exhibiting interesting, useful and unusual dyeing effects which have not heretofore been possible.

"Anthraquinone vat dyes," as the term is used herein, includes vat dyes based upon carbocyclic and heterocyclic quinones. It encompasses derivatives of simple quinones like benzoquinone, naphthoquinone and anthraquinone, or complex structures containin 4, 5, 6 or more condensed rings and keto groups. For example, anthraquinone vat dyes include vat dyes based on benzoquinone, naphthoquinone, acylaminoanthraquinones, benzanthraquinones, benzanthrone, dibenzanthrones, anthraquinonecarbazoles, anthraanthrone, pyranthrone, anthrapyrazolones, anthraquinoneoxazoles, anthraquinone azines, anthraquinone thiazoles, anthraquinone imidazoles, benzanthroneacridines, flavanthrone, anthraquinoneacridones, anthrapyrimides, pyrazinoanthraquinones, anthraquinoneazines, anthraquinone metoxazones, anthraquinone triazines, anthraquinone pyrans, anthraquinone diacridines, etc. This definition of the class of anthraquinone vat dyes is given in H. A. Lubs, The Chemistry of Synthetic Dyes and Pigments, Reinhold Corporation, 1955 at pages 335–336 and 431–550.

The anthraquinone disperse dyes which can be used are typically aminoanthraquinones in which one or more of the hydrogen atoms of the amino group are replaced by alkyl, aryl, aralkyl, hydroaryl, hydroxyalkyl, or other groups. They may bear additional substituents such as halogen, hydroxy, alkoxy, nitro, cyano, etc. Suitable anthraquinone disperse dyes include those defined and described in the hereinbefore-mentioned book by H. A. Lubs, particularly at pages 335–336 and 417–426.

This invention is applicable to composite filament structures including yarns, cords, fibers and fabrics at least one component of which is a filament obtained by melt spinning a polyester-polyamide blend. It is applicable to yarns obtained from filaments and to cords, fibers and fabrics obtained from yarns. The yarns may comprise several filaments at least one of which is a polyester-polyamide blend. The cords or fibers may comprise yarns at least one of which contains one or more polyester-polyamide filaments. In the simplest case, the structure to be dyed will comprise a mixture including filaments derived from polyester-polyamide blends containing different proportions of polyester.

According to the process of this invention, the polyester-polyamide blends will generally be dyed while in the form of fibers. Accordingly, for simplicity, the products described herein will generally be referred to as fibers, it being specifically understood that the term is used in its broadest generic sense to include monofilament, multifilament, yarn, staple, continuous filament, etc. These fibers dyed in accordance with this invention can be dyed as such; or the dyeing effects can be varied by dyeing the fibers in combination with one or more fibers including natural and synthetic fibers such as cotton, wool, silk, acetate, viscose, polyacrylonitrile, and other polyacrylics, polyesters, polyamides, polyolefins, and the like. The fibers may be formed into fabrics by weaving, knitting, felting, carding, braiding, plaiting, spin-bonding, etc.

While applicable to a variety of polyester-polyamide blends containing up to 50 parts by weight polyester this invention is especially useful with blends comprising dispersions of polyesters in polyamides containing from about 10 to about 50 parts by weight of polyester in a continuous body of 50 to 90 parts by weight of polyamide per 100 parts by weight of total polyester and polyamide. The polyesters from which the blends are prepared are substantially linear fiber-forming polyesters having recurring cyclic structure in the polymer backbone with a reduced viscosity in ortho-chlorophenol of from about 0.3 to 1.1 deciliters per gram.

The polyamides employed in the blends useful in this invention are substantially linear fiber-forming polyamides having an ortho-chlorophenol reduced viscosity of from about 0.6 to 1.3 deciliters per gram. Reduced viscosity is determined at 25° C. with solutions of the polymer in ortho-chlorophenol containing 0.5 gram of polymer per 100 millimeters of ortho-chlorophenol.

The blends are preferably prepared by melt blending suitable polyester-polyamide blends in an extruder at a temperature of from about 260° C. to about 285° C. at an apparent shear rate of at least 100 reciprocal seconds and extruding through a spinnerette at an apparent shear within the spinnerette of from about 2000, to 32,000 reciprocal seconds. Primary amino groups in the polyamide amount to no more than 10% of the terminal groups therein, this being accomplished, for example, by blocking primary amino groups with a monobasic or dibasic acid.

The preferred polyester is polyethylene terephthalate although others may be employed, more specifically those in which the recurring unit in the polyesters chain is the diacyl aromatic radical from terephthalic acid, isophthalic acid, 5-t-butylisophthalate, or naphthalene dicarboxylic acids such as naphthalene-2,6- and naphthalene-2,7-dicarboxylic acids.

The preferred polyamides are polycaproamides or polyhexamethylene adipamide since these are most readily available commercially. Other which are prepared from polyamide forming monomers containing 4 to 14 carbon atoms can also be used.

These blends are preferred and their preparation is described more fully in Twilley U.S. patent application Ser. No. 368,028 filed May 18, 1964, now U.S. Patent 3,369,057 issued Feb. 13, 1968, which is assigned to the same assignee as this application.

The individual drawn filaments used in this invention will typically have a thickness of the order of about 1.0 to 25 denier and will have a characteristic structure comprising microfibers of the polyester dispersed in a substantially continuous body of polyamide. The size configuration and distribution of the polyester microfibers will vary, depending upon the chemical and physical nature of the polyester and polyamide, the relative proportions of each, the blending and spinning conditions employed, the draw ratio, and any additional treatment of the fibers. Normally the polyester microfibers will have an elongated configuration with the longest axis of the microfiber substantially parallel to the fiber axis.

In accordance with this invention, the fibers may be dyed in any of the usual types of commercial dyeing equipment. Both low and high pressure equipment may be used.

Skein dyeing machines where the dye liquid is sprayed or cascaded over skeins of material to be dyed may be employed, or the dye may be circulated by a pump or propeller.

Dye auxiliaries such as wetting agents, emulsifying agents, carriers, sequestrants, swelling agents, developers, protective colloids, stabilizers, and the like may be used. It is preferred to utilize nonionic or weak anionic surfactants such as alkyl aryl polyethers. Condensates of ethylene oxides with long chain alcohols and polyoxyethylene surfactants are especially useful. Cationic surfactants can be employed if the usual precautions are taken to avoid agglomeration of disperse anthraquinone type dyes.

Swelling agents such as benzyl alcohol and the likes which are used to obtain deeper shades when dyeing polyamides can be used, but satisafctory shades can be obtained without them.

The anthraquinone vat dyes are generally applied by dissolving the dye in its reduced form in an aqueous medium. The fiber to be dyed is contacted with the aqueous dye solution for a sufficient time to obtain uniform penetration, adsorption and the desired depth of shade. The dyed fiber is then separated from the dye solution, excess solution is drained or otherwise removed, and the fiber is dried. Oxidation of the vat dye on the fiber, generally by atmospheric oxygen, converts the dye to the water-insoluble oxidized form.

Disperse dyes are applied in the form of a fine, typically colloidal, suspension of the dye in an aqueous medium. Such suspensions are generally prepared by grinding the dye in a colloid mill or the like in the presence of a suspending or dispersing agent such as a detergent.

Dye concentration in the aqueous medium from 0.5 to 2% by weight are satisfactory for most purposes although somewhat higher or lower concentrations may be employed without adverse effect. In some instances, for example to produce a strong black color, the concentration of the dye in the dye bath may be as high as 6% by weight.

The dyeing is typically carried out at elevated temperatures, say at least 150° F. and preferably at least about 200° F. Normally with polyester-polyamide blends the percent dye absorbed increases with increasing temperature. The dye absorption of the blends is not better than the dye absorption of the parent polyamide from which the blend is prepared at all dyeing temperatures. It is a characteristics of the blends, however, that with the anthraquinone dyes employed in this invention there is a temperature at which the blends manifest increased affinity compared to the parent polyamide. This temperature varies with particular dyes and with particular blends. Normally it is at least 150° F., and most often it will be 190° F. or higher. The optimum temperature for the preparation of a particular dyed product will vary with the dye and blend employed and can be readily determined by a simple series of dyeings over a range of about 0.5 to 9.0 hours.

Dyeing times will vary depending upon the nature of the dye and the fiber, the dye concentration, temperature, the weave and thickness of the cloth to be dyed and other factors. Typical dyeing time will be of the order of temperatures.

As stated above, the dyeing characteristics of polyester-polyamide blends vary with the polyester content of the blend. It has been discovered that under the same dyeing conditions the amount of dye absorbed increases with increasing polyester content of the blend. Thus for example, at the operating temperatures of the invention a polyester-polyamide blend containing 40 parts by weight polyester will absorb more dye, and therefore give a deeper tone, than a similar blend containing only 30 parts by weight polyester. This is a most unexpected phenomenon, since anthraquinone vat and disperse dyes normally color polyesters quite poorly. It would have been predicted therefore, that blends having a high polyester content would absorb less dye than those with less polyester.

The amount of anthraquinone vat and anthraquinone disperse dyes which will be absorbed by polyamides such as nylon 6 and nylon 66 is highly dependent on the hydrogen ion concentration of the dye bath. Normally, the amount of dye absorbed decreases markedly with increasing pH. In contrast, the amount of these dyes which will be absorbed by the polyester-polyamide blends which are ulitized in this invention is relatively insensitive to changes in hydrogen ion concentration over the pH range of from about 3 to about 9. A pH of less than about 3 is generally avoided because a significantly higher hydrogen ion concentration may lead to chemical attack on the fiber. Only in special instances is it desirable to dye a pH above 9. For example, in the field of carpeting, using a jute backing it is often desirable to perform the dyeing operation at a pH as high as 10 or higher to avoid the precipitation of discolored extraction products from the backing.

The basic discovery of this invention, that is the discovery of the increased affinity for anthraquinone vat and disperse dye of fibers prepared from polyester-polyamide blends containing up to 50 parts by weight of the polyester may be used to advantage for dyeing any fiber prepared from such blends. However by taking advantage of other dyeing characteristics set forth above, i.e. temperature dependence, insensitivity to changes in hydrogen ion concentration and increased dye absorption with increased polyester content it is possible to prepare dyed products with a variety of tone-on-tone and bicolor effects. These important advantages of the invention may be realized, for example, by varying the conditions of dyeing, the number and class of dyes in the dye bath, or the components of the dyed product. Thus for example it is possible to obtain different shades of the same color from the same dye bath on fabrics prepared from different fibers having different polyester content. It is also possible to dye one fabric prepared from two or more different fibers incuding at least one polyester-polyamide blend fiber in the same dye bath containing two or more different dyes. These and other applications of the invention are illustrated in the examples.

In accordance with the usual practices in the use of anthraquinone vat and disperse dyes, the dye pick-up of soluble anthraquinone sulfonate dyes can be improved by the addition of electrolytes such as sodium chloride to the dye bath. As with polyamides, the dye absorption of polyester-polyamide blends decreases with increasing draw ratio, although the amount of the decrease is somewhat less with the blends. It has also been observed that the dyeability of the blends increases with increasing shear in the extruder.

The polyester-polyamide dyed products prepared in accordance with this invention are characterized by deep, brilliant shades, brightness, good light fastness, good wash fastness and resistance to crocking. Because of these desirable attributes, fabrics of outstanding color and bicolor or tone-on-tone effects with a crisp, clear, bright appearance can be obtained. The finished goods are useful as apparel fabric as well as decorative fabric such as draperies, rugs, slipcovers, upholstery, etc.

The example given below illustrates the practice of certain specific embodiments of the invention. It will be understood that the invention is not limited to the specific embodiments herein disclosed, but includes all modifications and variations thereof which are apparent to those skilled in the art.

In the examples a number of polyester-polyamide blends comprising polyethylene terephthalate and nylon 6 are employed. Table I illustrates the physical properties of the principal products used in the examples and the conditions under which they are prepared.

TABLE I

| Polymer Properties | Nylon 6,6 | Nylon 6 | Percent Polyester/Polyamide | | |
|---|---|---|---|---|---|
| | | | 30/70 | 40/60 | 10/90 |
| Polyamide phase: | | | | | |
| End groups as carboxyl [1] | 72 | 49 | 75 | 75 | 75 |
| End groups as amines [1] | 44 | 48 | 6 | 6 | 6 |
| Polyester phase: | | | | | |
| End groups as carboxyl [1] | | | 55 | 55 | 55 |
| End groups as hydroxyl [1] | | | 56 | 56 | 56 |
| Polyester OCPR viscosity | | | 0.8 | 0.8 | 0.8 |
| Nylon OCPR viscosity | 1.05 | 1.05 | 1.055 | 1.055 | 1.055 |
| Spinning conditions, temperatures spun, °C | 275 | 265 | 270 | 268 | 270 |
| Extruder mixing shear, reciprocal seconds | | | 115 | 116 | 110 |
| Mixing shear within spinnerette, reciprocal seconds | | | 5,500 | 5,500 | 5,500 |
| Temperature of Drawing, °C | 185 | 185 | 185 | 185 | 185 |
| Draw ratio | 4.2 | 4.1 | 4.4 | 4.3 | 5.2 |
| Drawn diameter PE fibril, μ | | | .138 | .193 | .04 |
| Drawn PE fibril length/diameter | | | 1,670 | 1,000 | 5,160 |
| Number of PE fibrils/1,000μ², filament cross section | | | 20,000 | 14,100 | 95,000 |
| Ultimate tensile strength | 4.4 | 4.8 | 7.2 | 7.0 | 7.1 |
| Ultimate elongation | 28 | 31 | 26 | 23 | 17 |
| Stiffness index, UTS/UE | .16 | .15 | .28 | .305 | .417 |
| Initial tensile modulus, g.p.d | 22 | 25 | 58 | 65 | 52 |
| Hot-wet strength, g.p.d | 2.8 | 3.1 | 4.9 | 4.9 | |

TABLE I.—Continued

| Polymer Properties | Nylon 6,6 | Nylon 6 | Percent Polyester/Polyamide | | |
|---|---|---|---|---|---|
| | | | 30/70 | 40/60 | 10/90 |
| Hot-wet tensile modulus, g.p.d | 14 | 16 | 37 | 46 | 43 |
| Shrunken tensile modulus, g.p.d | 11 | 10 | 20 | 25 | 15 |
| Percent tensile recovery at 1% elongation | 80 | 81 | 85 | 88 | 83 |
| Percent work recovery at 1% elongation | 51 | 50 | 70 | 73 | 60 |
| Percent stress decay at 1% elongation | 27 | 26 | 17 | 16 | 23 |
| Yield stress in water at 21° C., g.p.d | .30 | .30 | 1.0 | 1.02 | .60 |
| Yield point in g./d. in air, at 70° F., 65% R.H. | .69 | .68 | 1.20 | 1.22 | 1.0 |
| Yarn denier | 120 | 120 | 120 | 120 | 120 |
| Number filaments | 20 | 20 | 20 | 20 | 20 |

[1] Milliequivalents per kilogram of polymer. The data are based on the analysis of the polymer before melt blending and spinning.

Unless otherwise specified dye baths are prepared by mixing the dye to be used with water to obtain a smooth, uniform paste or by dispersing the dye in five times its weight of the 10% alkyl aryl polyether surfactant sold under the trademark Naccanol SL. In either case, the mixture obtained is further diluted with water to 100 times the weight of the fibers to be dyed. The pH of the medium is adjusted to 8.0 and the dye bath heated at about 205° F. for one hour. The dye bath is then ready for use.

Unless otherwise stated the samples to be dyed are employed in the form of fabrics knitted from 20 filament, 120 denier yarns of round cross-section. They are skein dyed or piece-dyed in the form of knitted sleeves.

All dyed fabrics were rated under a MacBeth lamp by an experienced color analyst against a standard dyed nylon.

EXAMPLE 1

In this example the listed polyamides and polyester-polyamide blends were dyed at pH 8, and at the indicated temperatures with CI Disperse Blue 3, an anthraquinone dye at a concentration of 0.5% by weight.

The formula of the dye is:

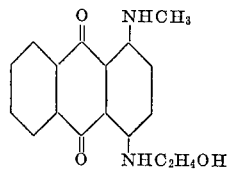

and the results obtained are listed in Table II.

TABLE II

| Temperature, °F. | Nylon 6,6 Control | Nylon 6, Control | 30% Polyester, 70% Polyamide | 40% Polyester, 60% Polyamide |
|---|---|---|---|---|
| 170 | 70 | 78 | 58 | 53 |
| 180 | 74 | 80 | 62 | 58 |
| 190 | 76 | 83 | 68 | 63 |
| 195 | 78 | 84 | 72 | 68 |
| 200 | 80 | 85 | 82 | 80 |
| 205 | 82 | 85.5 | 94 | 98 |
| 210 | 83 | 86 | 96 | 102 |
| 212 | 84 | 86 | 98 | 106 |

The table shows the differences in dye absorption as determined by the analyst. It illustrates the temperature range over which the blends have better dye affinity than nylon, shows that this improved affinity increases with increasing temperature, and that the blend with the more polyester has the better dye absorption of the two blends.

A four component fabric prepared from nylon 6,6 nylon 6, 30% polyester-70% polyamide and 40% polyester-60% polyamide and dyed with Disperse Blue 3 in one dye bath at 206° F. exhibited four different shades of the same color.

EXAMPLE 2

In this example samples of nylon 6 and 30% polyester 70% polyamide blend fabrics were dyed. One set of samples was dyed at various hydrogen ion concentrations with the acid Blue 40. Another set was dyed with the same anthraquinone dye CI Disperse Blue 3 used in Example 1.

The results are tabulated in Table III which lists the absorption values as determined by the analyst.

knitted from 40 denier, 12 filament, ½ Z twist continuous filaments.

TABLE IV

| Percent Dye | Color Index Name | Nylon 6 Color | Nylon 6,6 Color | 10% Polyester, 90% Polyamide | 30% Polyester, 70% Polyamide |
|---|---|---|---|---|---|
| .25 | Acid Yellow | } Greenish yellow | Olive | Bluish green | Greenish blue. |
| .25 | Disperse Blue 3 | | | | |
| 1.0 | Acid Yellow 38 | } Bright green | Greenish yellow | Greenish blue | Deep blue. |
| 1.0 | Disperse Blue 3 | | | | |
| .25 | Disperse Violet 11 | } Reddish pink | Pink | Scarlet | Deep scarlet. |
| .25 | Acid Orange | | | | |

TABLE III

| | Acid Dye | | Disperse Anthraquinone Dyes | |
|---|---|---|---|---|
| pH | Nylon 6 | 30% Polyester, 70% Polyamide | Nylon 6 | 30% Polyester, 70% Polyamide |
| 2.0 | 150 | 35 | | |
| 3.0 | 110 | 22 | 100 | 160 |
| 4.5 | 100 | 20 | 100 | 160 |
| 6.0 | 95 | 20 | 100 | 160 |
| 7.0 | 80 | 19 | 100 | 160 |
| 8.0 | 60 | 18 | 95 | 160 |
| 9.0 | 20 | 18 | 90 | 155 |

From the results reported in the table it can be seen that the tested polyester-polyamide blend has a very low affinity for acid dyes at any pH. It can also be seen that the blend has a much higher affinity than nylon 6 for the anthraquinone disperse dye tested and this affinity is substantially constant in both the acid and alkaline range. These same affects are observed with other acid dyes and anthraquinone disperse and vat dyes with other polyamides and with other polyesterpolyamide blends within the scope of this invention. It is thus possible to obtain a variety of dyeing affects by dyeing fabrics prepared from blends of polyamide fibers and polyester-polyamide fibers by dyeing the fabric in a dye bath containing both acid dyes and anthraquinone vat or disperse dyes. This is illustrated in Table IV below which reports the results of experiments in which fabrics prepared from nylon 6, nylon 6,6, 10% polyester-90% polyamide and 30% polyester-70% polyamide were dyed in the same dye bath containing the indicated dyes at their listed percentage concentrations by weight for one hour at 205° F. at pH 8. The fabric dyed was in the form of knitted stockings with two inch bands of each type of fiber. The stockings were From the results reported in Table V it will be apparent that by taking advantage of the novel and useful dyeing proportions of polyester-polyamide blends within the scope of this invention it is possible to prepare multicolored fabrics in the same dye bath containing at least one dye in addition to the anthraquinone disperse or vat dye.

These results can be extended to more complicated systems in which fabrics containing a plurality of fiber components, both natural and synthetic in addition to the polyester-polyamides blends used herein are dyed in a dye bath containing one or more dyes of various classes in addition to the anthraquinone disperse or vat dye. This is illustrated in Example 3.

EXAMPLE 3

Table V illustrates the results obtained by dyeing upholstery fabric prepared by weaving together the different fabrics listed. Dyeing was effected in one bath containing the dyes, which are indicated by their color index name, at the stated concentration. The fabric was scoured and piece dyed at 205° F. for one hour at a pH of about 7. The dye bath contained 0.1% by weight, based on the weight of the fabric dyed at Triton X–100 an isooctyl phenyl polyethoxy ethanol surfactant available from Rohm & Haas Co. of Philadelphia, Pa.

The fabrics not specifically identified in the table may be further identified as follows:

PE-PA blend: 30% polyester-70% polyamide
Polyester: polyethylene terephthalate
Polyacrylic: polyacrylonitrile-Orlon 42 [1]

[1] E. I. du Pont, Wilmington, Delaware.

TABLE V

| Percent Dye Used, *1 | Dye Name | Nylon 6 | PE-PA Blend | Polyester | Polyacrylic | Cellulose Acetate | Other |
|---|---|---|---|---|---|---|---|
| .25 | Disperse Yellow 13 | } Bright red | Bright orange | Light tan | White | Light orange | Silk brown. |
| .25 | Disperse Red 4 | | | | | | |
| .25 | Acid Red 4 | | | | | | |
| .25 | Acid Green 25 | } White | { Deep bright yellow red. | } Light orange | Light tan | Light yellow | Wool, blue green. |
| .25 | Acid Blue 25 | | | | | | |
| .5 | Disperse Orange 11 | | | | | | |
| .5 | Disperse Yellow 13 | | | | | | |
| 1.0 | Disperse Yellow 13 | } Bright blue | Yellow green | Light yellow | White | Yellow | Silk, light green. |
| 1.0 | Acid Green 25 | | | | | | |
| .25 | Acid Red 88 | } Bright violet | Bright scarlet | Light red | | Light red | Wool, light violet. |
| .25 | Acid Blue 25 | | | | | | |
| 1.0 | Disperse Red 4 | | | | | | |
| .25 | Mordant Yellow 8 | } Bright orange | Bright red | do | White | Light pink | Cotton, light red. |
| .25 | Direct Red 1 | | | | | | |
| .5 | Disperse Red 4 | | | | | | |
| .25 | Acid Blue 25 | } Navy blue | Brown | Light orange | do | Light orange | Wool, light. |
| .25 | Disperse Orange 11 | | | | | | |
| .10 | Disperse Yellow 5 | } Dark red | Light orange | Light yellow | Yellow | Pale green | { Rayon and cotton, medium orange. |
| 1.0 | Acid Red 57 | | | | | | |
| .5 | Disperse Red 4 | } Dark grey | Dark purple | Light grey | Light red | Medium red | Wool blue. |
| .5 | Acid Green 44 | | | | | | |
| 1.0 | Disperse Yellow 3 | Bright light green. | Bright deep yellow. | } Olive green | { Pale yellow stain. | } Medium yellow | Silk, light green. |
| .1 | Acid Blue 7 | | | | | | |
| .25 | Disperse Yellow 3 | Bright red orange. | Bright yellow orange. | } Light orange | Pale yellow | Light yellow | Wool, light red. |
| .5 | Acid Red 85 | | | | | | |
| .5 | Direct Blue 76 | } Navy blue | Red violet | Light red | Bright blue | Red | { Cotton and rayon, blue. |
| .5 | Basic Blue 22 | | | | | | |
| .25 | Disperse Red 4 | | | | | | |
| 1.0 | Direct Blue 76 | } Bright navy | Bright red | do | Stained red | Medium red | Wool olive. |
| .5 | Disperse Red 4 | | | | | | |
| 1.0 | Disperse Violet 4 | } Medium pink | Bright scarlet | { Medium reddish blue. | { Light violet | Light violet | |
| 1.0 | Vat Orange 9 | | | | | | |
| .5 | Direct Blue 76 | | | | | | |
| 1.0 | Acid Yellow 38 | } Bright green | Deep blue | Medium blue | | Light blue | |
| 1.0 | Disperse Blue 3 | | | | | | |

EXAMPLE 4

The results reported in Table VI illustrate the markedly increased absorption of 30% polyester-70% polyamide blends dyed at the dye concentration indicated with a variety of anthraquinone disperse and anthraquinone vat dyes.

TABLE VI

| Dye Name Color Index | Percent Dye Used | Relative Percent Dye (Strength) | |
|---|---|---|---|
| | | Nylon 6 | PE-PA Blend |
| Disperse Red 4 | .5 | 100 | 160 |
| Disperse Blue 3 | 1.0 | 100 | 160 |
| Disperse Violet | 0.5 | 100 | 120 |
| Disperse Yellow 13 | 1.0 | 100 | 120 |
| Disperse Orange 11 | .5 | 100 | 120 |
| Vat Red 35 | 1.0 | 100 | 160 |
| CI Vat Yellow 1 (Flavanthrone) | .50 | 100 | 120 |
| Vat Orange 3 | .5 | 100 | 110 |
| Vat Orange 9 (Pyranthrone) | 1.0 | 100 | 120 |
| Vat Blue 4 (Indanthrone) | 1.0 | 100 | 130 |
| Vat Yellow 5 | .5 | 100 | 140 |
| Vat Black 25 | .5 | 100 | 120 |

The formulas for the dyes in Table VI are as follows:

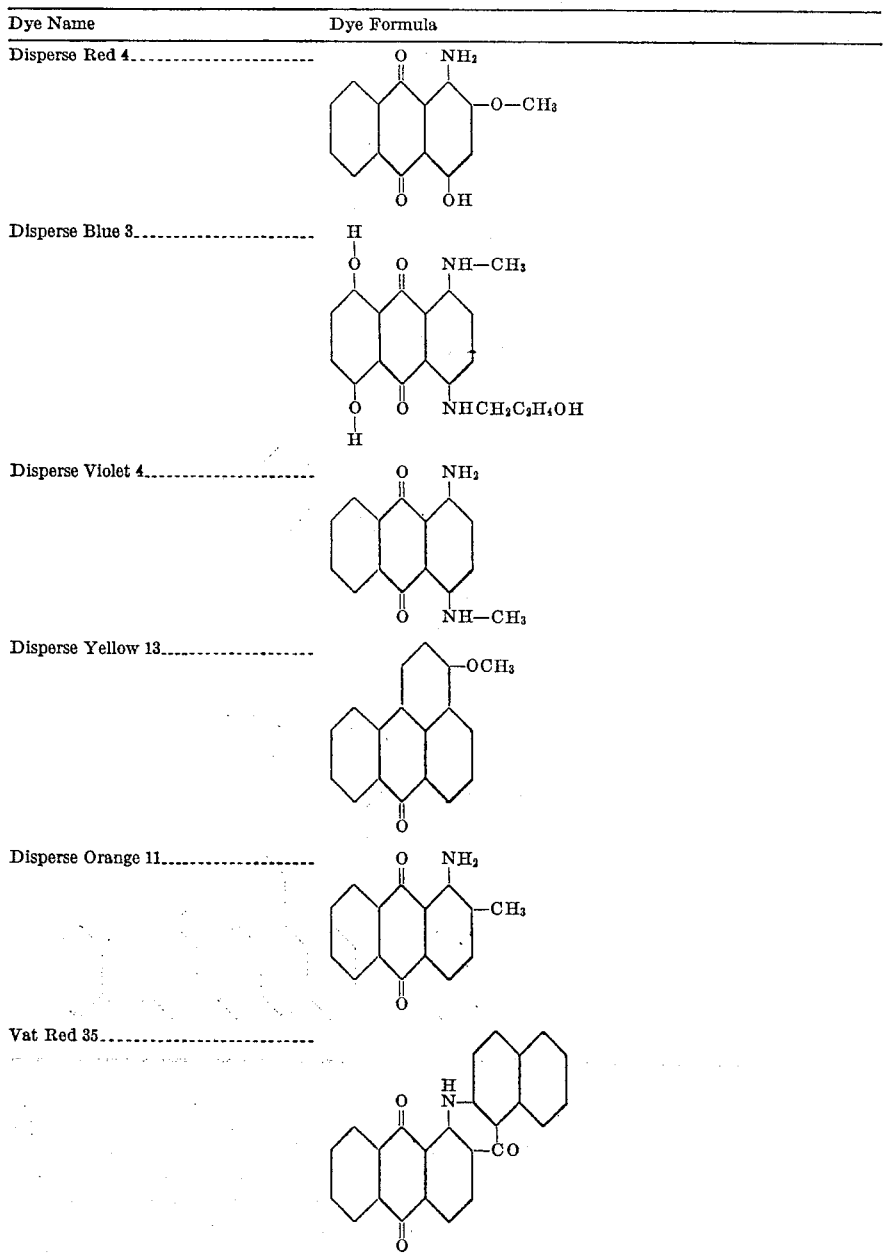

| Dye Name | Dye Formula |
|---|---|
| CI Vat Yellow 1 (Flavanthrone) | 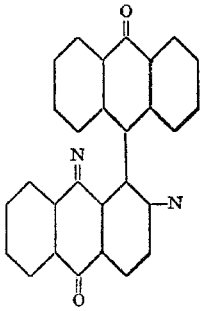 |
| Vat Orange 3 | 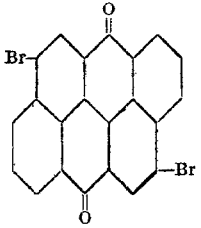 |
| Vat Orange 9 (Pyranthrone) | 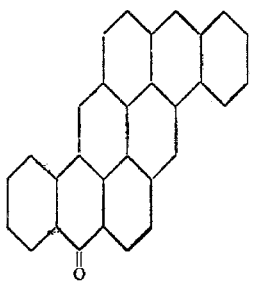 |
| Vat Blue 4 (Indanthrone) | 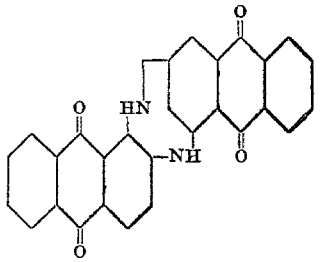 |
| Vat Yellow 5 | 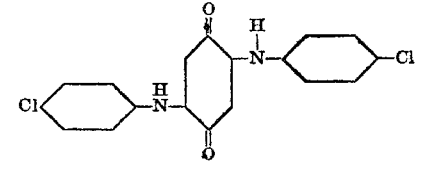 |
| Vat Black 25 | 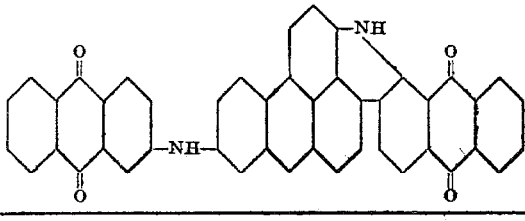 |

EXAMPLE 5

A very significant and unexpected advantage of this invention is the finding that polyester-polyamide blends dyed with anthraquinone vat and disperse dyes exhibit improved light fastness without deterioration in wash fastness and staining compared to polycaproamides and other fibers such as cellulose acetate, polyacrylonitrile, cotton rayon and wool. Table VII below records results obtained when knited sleeves of nylon and of a 30% polyester-70% polyamide blend were dyed with the dyes listed at the indicated dye concentrations and comparatively tested for these properties in accordance with standard procedures.

For the testing, the knitted sleeves were initially, scoured with an aqueous mixture of 0.2% by weight Nacconol SL (alkyl aryl sulfonate available from Allied Chemical Corp., New York, N.Y.).

Each of the dye baths contained 0.1% by weight, based on the weight of the fabric of Triton X–100. Dyeing was effected at pH 7.

The dyed fabrics were rinsed and dried in the conventional manner before testing.

Light fastness was evaluated by exposure to a carbon arc lamp according to A.A.T.C.C. test method 16A–1464 as described in the A.A.T.C.C. Technical Manual at pages B66–B68. In the table the results are recorded with integers indicating the times the samples show "just appreciable fading" in accordance with the test method. These integers or light fast numbers should be interpreted according to the following table.

| Light fast number | Exposure time, hours |
|---|---|
| 1 | 2.5 |
| 2 | 5 |
| 3 | 10 |
| 4 | 20 |
| 5 | 40 |
| 6 | 80 |
| 7 | 160 |
| 8 | 320 |

Where two numbers are given in the table, fading occurred between the exposure times indicated, and closer to the time indicated by the first listed number.

Wash fastness and staining tests were carried out in acordance with test method 36–1961 as described in A.A.T.C.C. Technical Manual at pages B82–83.

In the tests, the degree of color alteration or wash fastness was rated as was the degree to which they stained or transferred color to nylon. The tests were rated as follows:

| Wash Fastness | Staining or Color Transference |
|---|---|
| 5—Negligible or no change. | 5—Negligible or no staining. |
| 4—Slight change. | 4—Slightly stained. |
| 3—Noticeably changed. | 3—Noticeably stained. |
| 2—Considerably changed. | 2—Considerably stained. |
| 1—Much changed. | 1—Heavily stained. |

The improved properties of the dyed polyester-polyamide blends compared to the polyamide tested are readily apparent from Table VII. Similar results are obtained with other blends within the purview of the invention when compared with other polyamides and with a variety of other natural and synthetic fibers. The improved properties illustrated in Table VII are retained by the anthraquinone disperse and vat dyed fibers of this invention even when the fibers are dyed from dye baths containing additional dyes such as acid and premetallized dyes in combination with the anthraquinone dye. Similarly they are retained when the fiber blends are formed into fabrics containing one or more additional fibers.

What is claimed is:

1. A process for dyeing a fiber comprising a polymer blend of polyester microfibers dispersed in a polyamide matrix, said fiber containing about 10 to 50 parts by weight polyester per 100 parts by weight of total polyamide and polyester, which comprises contacting said fiber with an aqueous dye bath containing about 0.1 to 6 weight percent, based upon the weight of the fiber dyed, of a dye selected from the group consisting of anthraquinone vat and anthraquinone disperse dyes for a period of time sufficient to obtain uniform penetration, adsorption and the desired depth of shade, said dye bath being maintained at a temperature of at least 150° F. and a pH between about 3 to 10; removing the dyed fiber from said dye bath and drying said fiber.

2. The process of claim 1 wherein said fiber comprises about 10 to 50 parts by weight of polyethylene terephthalate dispersed in about 50 to 90 parts by weight of a polyamide selected from the group consisting of polycaproamide and polyhexamethylene adipamide per 100 parts by weight of total polyamide and polyethylene terephthalate.

3. The process of claim 2 wherein said aqueous dye bath contains about 0.5 to 2 weight percent, based upon the weight of the fiber dyed, of a dye selected from the group consisting of anthraquinone vat and anthraquinone disperse dyes for a period of time of about 0.5 to 9 hours, said dye bath being maintained at a temperature of about 200 to 212° F. and a pH between about 3 to 9.

TABLE VII

| Dye (Disperse) | | Light Fastness | | Wash Fastness | | Staining | |
|---|---|---|---|---|---|---|---|
| Name | Percent | Nylon | 6 Blend | Nylon | 6 Blend | Nylon | 6 Blend |
| Blue 14 | 1.0 | 3 | 5 | 3–2 | 4 | 3 | 3 |
| Blue 7 | 1.0 | 2 | 5 | 4–3 | 3 | 2 | 3 |
| Violet 4 | 1.0 | 4–3 | 5–4 | 4 | 3 | 2 | 3 |
| Blue 3 | 1.0 | 3 | 4–5 | 4–3 | 4 | 3 | 3 |
| Red 4 | 1.0 | 4 | 6–5 | 4–3 | 4 | 3 | 3 |
| Yellow 3 | .5 | 8–7 | 8 | 4–3 | 4 | 4–3 | 4 |
| Yello 5 | .5 | 5–4 | 6 | 4–3 | 4 | 3 | 4 |
| Blue 9 | 1.0 | 4–3 | 5–6 | | | | |
| Blue 1 | .5 | 4–3 | 5–6 | | | | |
| Red 15 | 1.0 | 3–2 | 4–5 | 5–4 | 5–4 | 3–2 | 3 |
| Red 11 | .5 | 6–5 | 6 | 5–4 | 5–4 | 2 | 3 |
| Violet 1 | .5 | 4–3 | 5 | 2 | 3 | 2 | 3 |
| Violet 11 | .5 | 4 | 5–6 | 2 | 3 | 2 | 3 |

II—Wash Test No. II, all others Wash Test No. III.

References Cited

UNITED STATES PATENTS 2,930,670  3/1960  Bradshaw et al. _____ 8—21 X
3,369,057  2/1968  Twilley _____ 260—857

FOREIGN PATENTS 747,622  4/1956  Great Britain.
999,878  7/1965  Great Britain.

OTHER REFERENCES

Du Pont Technical Bulletin, N–56, February 1956, pp. 7–14 (particularly 12 and 13).

DONALD LEVY, Primary Examiner

B. BETTS, Assistant Examiner

U.S. Cl. X.R.

8—21, 39